United States Patent [19]

Hoag et al.

[11] Patent Number: 4,552,439
[45] Date of Patent: Nov. 12, 1985

[54] COOLED MIRROR AND METHOD OF COOLING SAME PARTICULARLY USEFUL IN LASERS

[75] Inventors: Ethan D. Hoag, Boston, Mass.; Amotz Ravid, Ramat-Gan, Israel

[73] Assignee: Metalworking Lasers International Ltd., Tel Aviv, Israel

[21] Appl. No.: 544,132

[22] Filed: Oct. 21, 1983

[30] Foreign Application Priority Data

Nov. 1, 1982 [IL] Israel .................................. 67142

[51] Int. Cl.$^4$ .............................................. G02B 5/08
[52] U.S. Cl. ................................................... 350/610
[58] Field of Search ............................... 350/609, 610

[56] References Cited

U.S. PATENT DOCUMENTS 3,909,118 9/1975 Schmidt ........................... 350/610
3,942,880 3/1976 Zeiders, Jr. ........................ 350/609
4,143,946 3/1979 Leo et al. ........................... 350/610
4,431,269 2/1984 Barnes, Jr. ......................... 350/610

Primary Examiner—John K. Corbin
Assistant Examiner—Loha Ben
Attorney, Agent, or Firm—Benjamin J. Barish

[57] ABSTRACT

A cooled mirror particularly useful in lasers conducts a cooling fluid through a plurality of parallel paths to impinge on the underface of the reflector member at a plurality of discrete points thereon. The velocity of the cooling fluid is increased such that it issues in the form of a high-velocity jet at each of the discrete impingement points on the underface of the reflector member. The reflector member is thin and flexible and is supported from a rigid base by a plurality of spaced supporting elements in such manner so as to reduce bending of the reflector member by thermal deformation.

19 Claims, 7 Drawing Figures

COOLED MIRROR AND METHOD OF COOLING SAME PARTICULARLY USEFUL IN LASERS

BACKGROUND OF THE INVENTION

The present invention relates to a cooled mirror, and also to a method of cooling a mirror. The invention is particularly useful as a laser mirror, such as described in U.S. Pat. No. 3,942,880, and is therefore described below with respect to such application.

Lasers of increasing power outputs are now being developed particularly for use in metal-working and other industrial applications. The cooling of the mirrors in such high-power lasers is one of the problems limiting their size since 1–2% of the laser power is absorbed in each mirror. Thus, a laser of 10 kWatts output absorbs from 100–200 watts, which creates serious problems particularly in the thermal deformation of the mirrors since such deformation must be held to very small tolerances for the proper operation of the laser.

U.S. Pat. No. 3,942,880 describes a cooled laser mirror addressed particularly to this problem. The laser therein described includes a reflector face, a base, and a plurality of spaced slender, supporting elements joining the reflector face to the base such as to provide a high resistance to thermal deformation tending to cause bending of the reflector face. That is to say, the slender supporting elements, which extend perpendicularly to the reflector face, constrain the deformation caused by thermal expansion to the direction of the plane of the reflector face, i.e., normal to the axes of the slender supporting elements, and substantially reduce or eliminate thermal deformation axially of the slender supporting elements tending to bend the reflector face. The patent describes these slender supporting elements as rods or wires. It further describes the provision of heat-conductor bars extending from the reflector face between and spaced from the supporting rods, and means for feeding a cooling fluid, such as water, through the spaces between the supporting rods and the heat-conductor bars.

The amount of heat that can be dissipated by the arrangement of this patent, however, even when a cooling fluid is used, is still very limited from a practical aspect when considering practical rates of flow of the cooling fluid. Moreover, the cooling effected by such fluid is not uniform, thereby further contributing to thermal bending of the mirror, e.g., when used in high power lasers. Furthermore, in many higher-power lasers now being designed, the laser beam is non-uniform in cross-section, e.g., of annular configuration, which results in an uneven distribution of the power to be absorbed by the mirror, thereby further increasing the bending deformation caused in the mirror by the uneven thermal expansion.

An object of the present invention is to provide a cooled mirror structure similar to that of U.S. Pat. No. 3,942,880, but which has a far greater capability of dissipating the energy absorbed by the mirror, and therefore, of reducing the bending deformation caused by thermal expansion of the mirror, thereby making the cooled mirror particularly suitable for high-power lasers. Another object of the invention is to provide a method of cooling mirrors or other members, particularly useful for cooling laser mirrors.

BRIEF SUMMARY OF THE INVENTION

According to a broad aspect of the present invention, there is provided a cooled mirror particularly useful in lasers, comprising a reflector member, a rigid base, a plurality of spaced supporting elements joined to the underface of the reflector member and to the base such as to reduce bending of the reflector member by thermal deformation, and cooling means for cooling the reflector member; characterized in that the cooling means comprises an inlet for a cooling fluid, an outlet for the cooling fluid, and fluid-conducting means constraining the cooling fluid to flow from the inlet, through the spaces between the plurality of spaced supporting elements along a plurality of paths which are in parallel between the inlet and outlet, and then through the outlet to impinge on the underface of the reflector member at a pluality of discrete points thereon each located in one of said parallel paths.

According to a further feature of the invention, the fluid-conducting means increases the velocity of the cooling fluid in each of the parallel paths so as to form high-velocity jets when impinging on the underface of the reflector member at the plurality of discrete points thereon.

In one described embodiment, the fluid-conducting means comprises passageways through the plurality of spaced supporting elements, the latter being in the form of hollow tubes, the hollow tubes being further formed with holes through the walls adjacent to their ends where joined to the underface of the reflector member.

In a second described embodiment, the plurality of supporting elements are solid pegs mounted to the base and passing through holes in the partition, which holes are of slightly larger cross-sectional area than the pegs so as to provide passageways between them for conducting the cooling fluid to flow in the form of high-velocity annular jets to impinge the underface of the reflector member at the plurality of discrete points thereon.

In a third described embodiment, the fluid-conducting means comprises: a plurality of inlet openings through the base between the spaced supporting elements, the inlet openings leading from the inlets to the underface of the reflector member; and a plurality of outlet openings through the base between the spaced supporting elements, the outlet openings leading from the outlet to the underface of the reflector member.

Such a construction provides for very efficient cooling of the mirror in such manner so as to substantially reduce or eliminate any bending deformation caused by thermal expansion. Thus, the cooling is effected in parallel at discrete points or spots on the mirror such as to minimize uneven cooling and, therefore, distortion of the reflector face. Moreover, the described arrangement extends the heat-transfer surface with respect to the cooling fluid, providing a longer contact period, and therefore requiring a lower flow rate of the cooling fluid. Further, the lower rate required, and the parallel paths taken by the cooling fluid, result in a lower pressure drop in the fluid. Still further, by having the fluid impinge on the reflector in the form of high-velocity fluid jets, the cooling effected of the reflector is enhanced since, as well known, "stagnation point cooling" results in a much higher heat transfer coefficient at a surface than that associated with fully developed boundary layers.

The invention also provides a method of cooling a mirror or other member characterized in directing a cooling fluid to flow through a plurality of spaced parallel paths to impinge on a face of the member at a plurality of discrete points thereon, and increasing the velocity of the fluid in each of the plurality of parallel paths such that the fluid takes the form of high-velocity jets, when impinging on the underface of the member at the plurality of discrete thereon.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

The FIGS. 1–4 Embodiment

Figure 1:
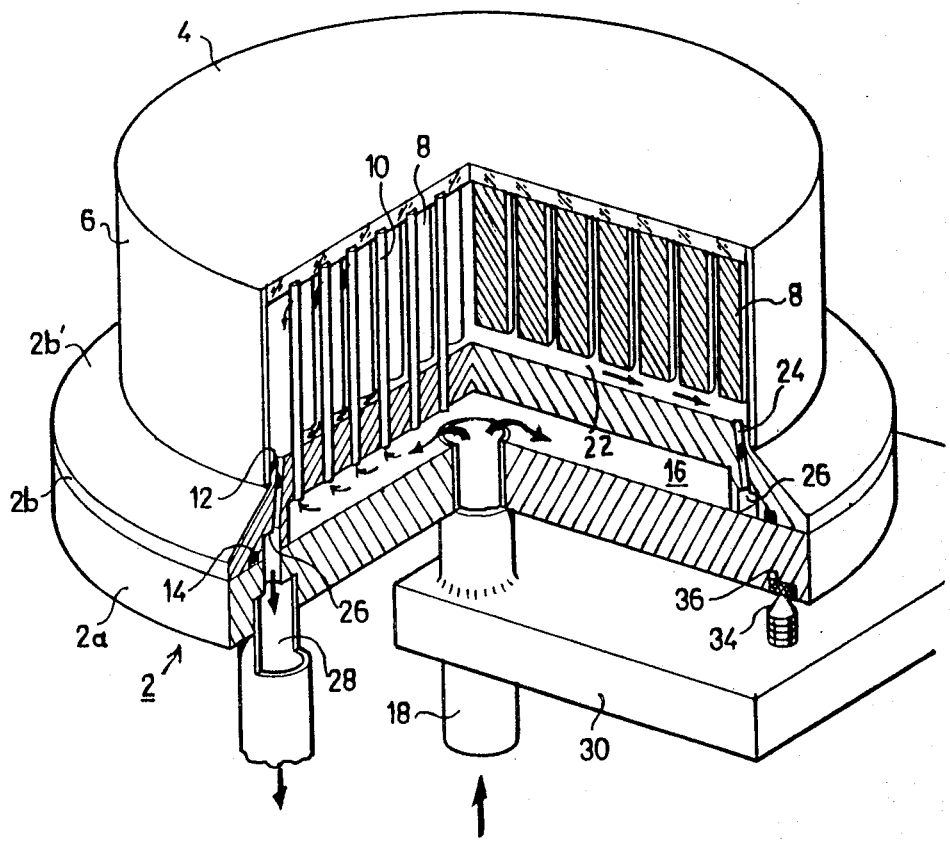
FIG. 1 is a three-dimensional view, partly broken away to show internal structure, of one form of cooled mirror constructed in accordance with the present invention.

The cooled mirror illustrated in FIGS. 1–4 of the drawings is of the general type described in the above-cited U.S. Pat. No. 3,942,880. Briefly, it comprises a rigid base, generally designated 2, on one side; a reflector member or face 4 on the opposite side; and a cylindrical wall 6 joining the two together. Base 2 is relatively thick so as to be rigid and may be made, for example, of stainless steel or bronze. The reflector face 4 is thin so as to be relatively flexible, and may be made, for example, of copper or molybdenum. The cylindrical wall 6 is also thin so as to be relatively flexible and may be of the same material as base 2, e.g., stainless steel or bronze.

Depending from the inner surface of the reflector face 4 are a plurality of spaced heat-conductor bars 8, e.g. of copper; and disposed in the spaces between bars 8 are a plurality of spaced, parallel, slender, supporting elements 10 joined to the inner surface of the reflector face 4 and the inner surface of the rigid base 2, such as to substantially reduce or eliminate thermal bending of the reflector face 4. Thus, the slender supporting elements 10 permit thermal expansion of the reflector face 4 of the mirror in the plane of the reflector face 4 (i.e., normal to the axes of the supporting elements 10), but substantially reduce or eliminate thermal deformation of the reflector face axially of the mirror (i.e., parallel to the axes of the supporting elements 10).

However, as distinguished from the mirror described in U.S. Pat. No. 3,942,880, these slender supporting elements 10, instead of being in the form of rods or wires as described in that patent, are in the form of hollow capillary tubes which permit a cooling fluid to be circulated through their interiors, and then through their exteriors between their outer faces and the outer faces of the heat-conductor cylinders 8. In addition, the structure of the rigid base 2 in the mirror illustrated in the drawings is quite different from that of the cited patent, as described below together with still other differences in the two constructions.

With respect to the structure of the rigid base 2, it will be seen that it is constituted of two sections, namely an outer section 2a remote from the reflector face 4, and an inner section or partition 2b between it and the reflector face. The outer section 2a is of cylindrical shape, and the inner section 2b is of similar cylindrical shape except that its inner (upper in FIG. 1) end is inwardly tapered, as shown at $2_b'$ in FIG. 1.

Figure 2:
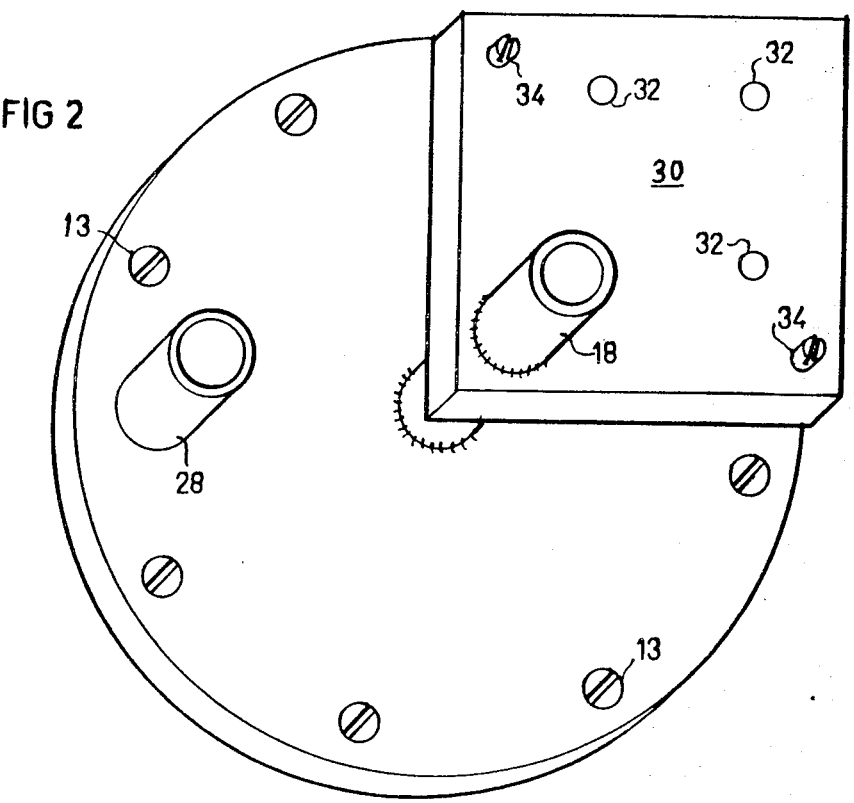
FIG. 2 is a three-dimensional view illustrating the opposite side of the cooled mirror of FIG. 1.

The latter end of base section $2_b$ is formed with an annular shoulder 12 for the reception of the respective end of the cylindrical side wall 6. Side wall 6 is fixed by any suitable means, such as by soldering or brazing, to base section $2_b$, and at the opposite end to the reflector face 4, the latter also being of circular configuration. The two base sections 2a, 2b are secured together by any suitable means, preferably by removable fasteners 13 (FIG. 2). They include between them a sealing ring 14 to provide a seal for the cooling liquid circulated within the mirror, as described below.

The side of base section 2b facing base section 2a is formed with a cylindrical cavity defining a chamber 16 when the two sections are secured together. Chamber 16 is fed by a cooling liquid via an inlet tube 18 passing through the center of base section 2a. The plurality of capillary tubes 10 extend through openings formed in base section 2b so as to communicate with the inlet chamber 16 for the cooling liquid. The capillary tubes are all secured within these openings in base section 2b so that the cooling liquid from the inlet chamber 16 may be conducted through the interiors of the capillary tubes to their upper ends, i.e., their ends adjacent to the reflector face 4.

Figure 3:
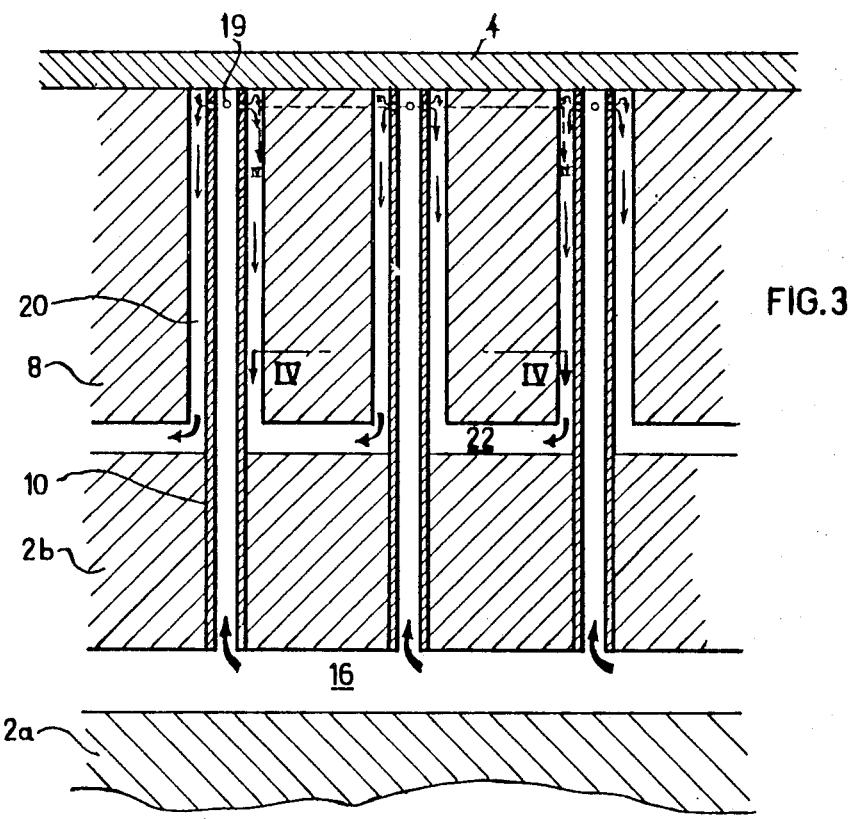
FIG. 3 is an enlarged sectional view illustrating details of construction of the cooled mirror of FIGS. 1 and 2.

As shown particularly in FIG. 3, the upper ends of the capillary tubes 10 are formed with a plurality of openings 19 extending through the walls of the tubes adjacent to the reflector face 4, to permit the cooling liquid to flow from the interiors of the tubes to their exterior faces, and then in the return direction through the spaces 20 between the capillary tubes 10 and the heat-conductor bars 8. The capillary tubes 10 are dimensioned to support the reflector face 4 and the heat-conductor bars 8 such that the inner faces of the bars are spaced from the respective face of base section 2b, to define an outlet chamber 22 through which the cooling liquid flows from the spaces 20. Base section 2b is further formed with an annular array of openings 24 passing through base section 2b and leading to an annular groove 26 which collects the cooling liquid flowing from the outer chamber 22 and directs it to an outlet tube 28 extending through the outer base section 2a.

Figure 4:
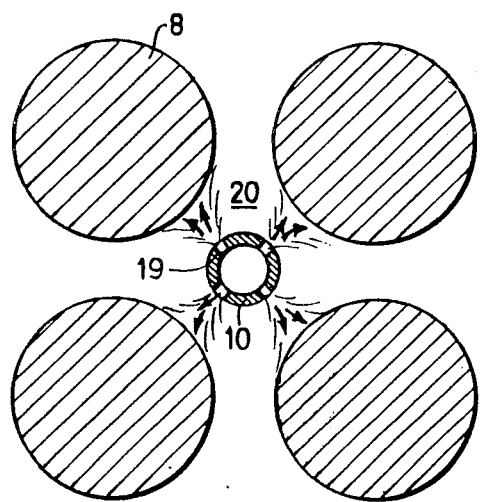
FIG. 4 is a sectional view along lines IV—IV of FIG. 3.

As shown in FIGS. 3 and 4, the heat-conductor bars 8 are of cylindrical configuration and are aligned with each other along both axes such that each of the capillary tubes 10 is equally spaced from four contiguous bars. Each capillary tube 10 includes four holes 19, one for each of the heat-conductor bars 8 and oriented in the direction of its respective bar. As further shown, particularly in FIG. 4, each of the holes 19 formed through the walls of the capillary tubes 10 is of substantially smaller diameter than the inner diameter of the capillary tube; also, the four outlet holes 19 of each capillary tube 10 have a total cross-sectional area less than that of the capillary tube itself. Thus, the cooling liquid passing through the interior of the capillary tubes 20 issues through the holes 19 in the form of high-velocity liquid jets, thereby producing stagnation-point cooling enhancing the cooling of the reflector face 4.

The illustrated mirror further includes a mounting block 30 (FIGS. 1 and 2) of substantially square configuration and secured, at one corner, to the inlet tube 18, such that the mounting block underlies about one-quarter of the mirror. Mounting block 30 is formed with a plurality of mounting holes 32 for mounting the block, and the mirror carried thereby, to a suitable supporting member, such as the optical frame in a laser. Mounting block 30 further includes two adjusting screws 34 passing through the block and engageable with the outer face of base section 2a, the latter being provided with hard inserts 36 to be engaged by the tips of the adjusting screws 34. As shown particularly in FIG. 2, the two adjusting screws 34 are disposed along lines intersecting the inlet tube 18, to which the mounting block 30 is secured, at a right-angle, so that a two-axis adjustment can be effected by threading the screws 34 more or less through the mounting block.

The operation of the cooled mirror illustrated in the drawings will be apparent from the above description. Thus, when the reflector face 4 of the mirror is used for reflecting a laser beam, or for reflecting another form of high-energy which causes the mirror to absorb substantial amounts of heat which might tend to bend the mirror by thermal deformation, the heat absorbed by the reflector face 4 of the mirror is efficiently dissipated by feeding a cooling fluid, such as water, through the inlet tube 18 and into the inlet chamber 16. From there, the cooling liquid flows, in parallel, through the interiors of all the capillary tubes 10 to their upper ends adjacent to the reflector face 4, the holes 19 at the upper ends of the capillary tubes, the spaces 20 between the capillary tubes and the heat-conductor bars 8 to the outlet chamber 22, the openings 24 to the collector recess 26, and finally through the output tube 28.

It will thus be seen that the illustrated structure effects the cooling of the reflector face 4 of the mirror in a plurality of discrete points all in a parallel manner, thereby decreasing the possibility of uneven cooling which is liable to cause thermal distortion of the reflector face 4. In addition, the capillary tubes 10 provide long parallel paths having extensive heat-transfer surfaces, so that there is a longer contact period between the cooling liquid and the surfaces to be cooled. This enables very efficient cooling to be effected at a relatively low flow rate of the cooling liquid. Further, since all the flow paths of the cooling liquid are in parallel, a substantially lower pressure drop in the cooling liquid is experienced, thereby enabling smaller pumping equipment to be used for circulating the cooling liquid. Still further, since the cooling liquid issues through the openings 19 in the form of high-velocity jets, as described above, very close to the rear surface of the reflector face 4 where most of the heat is generated, stagnation-point cooling is effected by these impinging jets thereby substantially enhancing the cooling effect.

As one example, the reflector face 4 of the cooling mirror may have an outer diameter of about 10 cm, and may use about 1,000 capillary tubes 10 for supporting it to the rigid base 2. Each of the capillary tubes 10 may have an inner diameter of 0.25–1.0 mm and a wall thickness of 0.10–0.50 mm. Particularly good results have been experienced using capillary tubes having an inner diameter of about 0.75 mm and a wall thickness of 0.125 mm, providing an outer diameter of 1.0 mm. The capillary tubes may each have a length of 15–20 mm. The above described example thus provides about 12–13 capillary tubes per cm$^2$ of the reflector face being cooled, each of which capillary tubes defines one of the parallel paths through which the cooling liquid flows until impinging on the underface of the reflector face.

Figure 5:
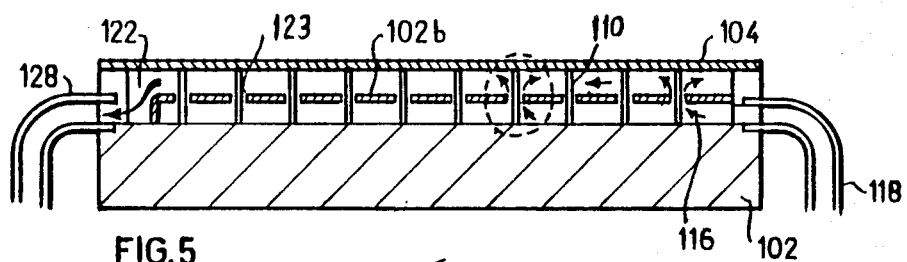
FIGS. 5 and 6 illustrate a second form of cooled mirror constructed in accordance with the present invention.
Figure 6:
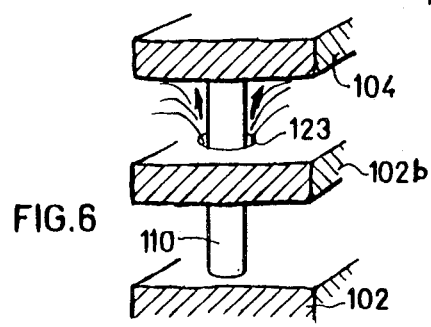

The FIGS. 5–6 Embodiment

The embodiment of FIGS. 5 and 6 is also in the form of a mirror, including a rigid base 102, and a thin reflector member or face 104 on the opposite side joined by a plurality of spaced, paralled supporting elements 110 in such manner so as to substantially reduce or eliminate thermal bending of the reflector face 104. In this case, however, the supporting elements 110 are in the form of solid rods or pegs. Also, the heat-conductor bars (8 in FIGS. 1–4) are omitted.

In this embodiment, the base 102 includes an inner section or partition 102b dividing the interior of the mirror into an inlet chamber 116 for a cooling fluid (e.g., water) communicating with an inlet tube 118, and an outlet chamber 122 communicating with an outlet tube 128. As in FIGS. 1–4, the cooling fluid is constrained to flow in parallel paths to impinge on discret points on the underface of the reflector member 104. For this purpose, base member or partition 102b is formed with openings 123 of slightly larger diameter than the outer diameter of the pegs 110, to permit the cooling fluid to flow through the clearance between each of the pegs 110 and the partition 102b. These clearances 123 are each of sufficiently small cross-sectional area that they increase the velocity of the cooling liquid to form annular jets which impinge on the underface of the reflector member 104, thereby producing the enhanced "stagnation point cooling" described earlier at each of the plurality of discrete points, namely the junctures with the pegs 110, on the underface of the reflector member.

The number of pegs 110, and therefore the number of parallel paths of flow of the cooling fluid and discrete points of impingement on the reflector member 104, may be the same as described above with respect to the FIGS. 1–4 embodiment.

Figure 7:
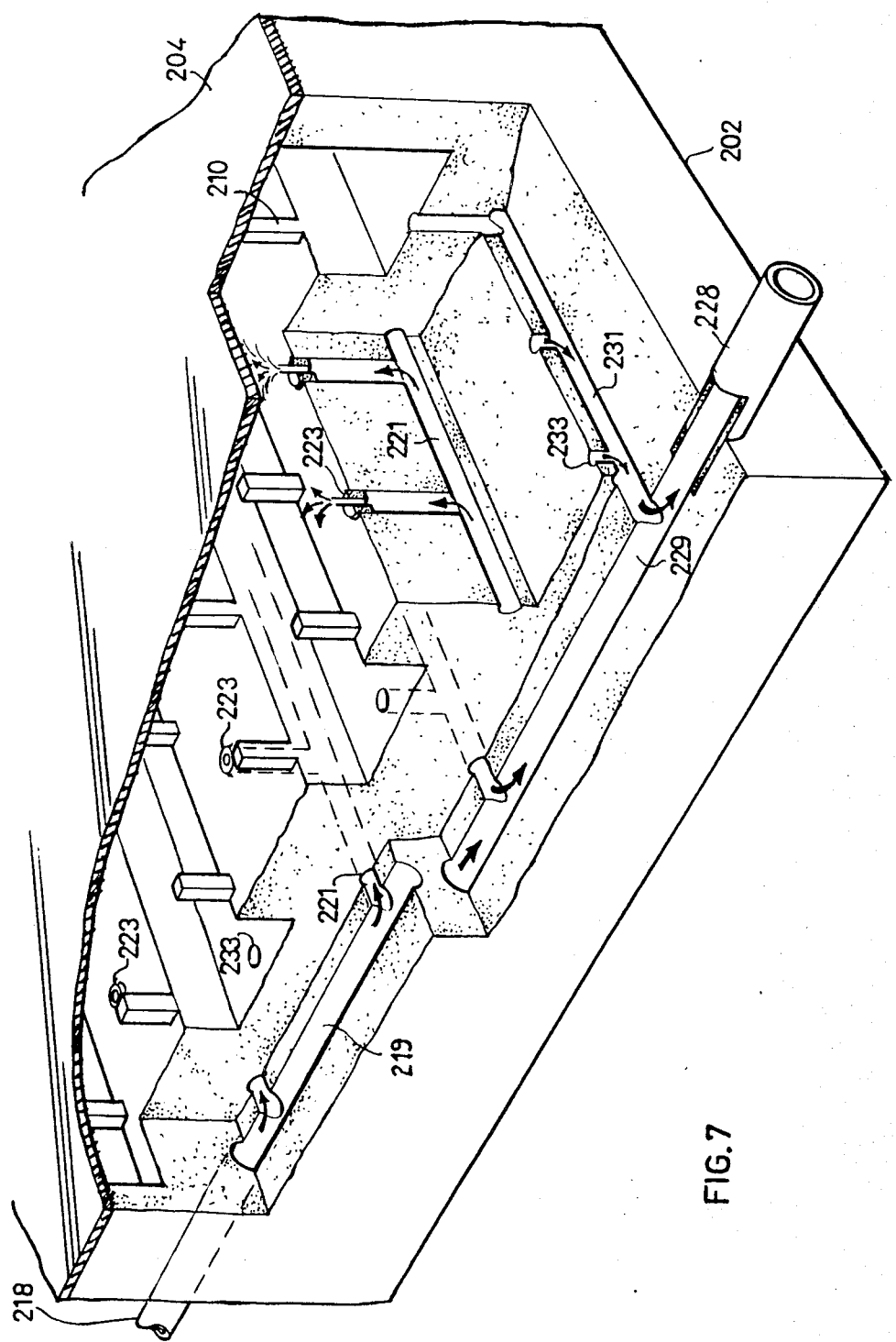
FIG. 7 illustrates a third form of cooled mirror constructed in accordance with the present invention.

The FIG. 7 Embodiment

FIG. 7 illustrates a third embodiment of the invention, also applied for cooling a mirror including a rigid base 202 and a thin reflector member or face 204 supported by a plurality of spaced, parallel supporting elements 210 in such manner, as described above, so as to eliminate or substantially reduce bending of the reflector member by thermal deformation. In the FIG. 7 embodiment, however, the plurality of supporting elements 210 are constituted of pegs 210, of squared cross-section in this case, integrally formed from the base 202. These pegs are disposed in lines according to a rectangular matrix. In addition, the parallel paths through which the cooling fluid (e.g., water) flows in order to impinge on the discrete points of the underface of the reflector member 204, are not defined by these pegs 210, but rather are defined by inlet and outlet openings formed through the base between these pegs.

Thus, the cooled mirror illustrated in FIG. 7 includes an inlet tube 218 leading to an inlet header 219 formed through the base along one axis, which header is joined with a plurality of branches or passageways 221 spaced along the header and perpendicular with respect to it. Each of the branch passageways 221 leads to a line of inlet openings 223 passing through the inner face of the base in the centers between alternate lines of pegs 210.

The base further includes an outlet tube 228 for the cooling liquid, which outlet tube communicates with an outlet header 229 also having a plurality of branches or passageways 231 spaced along the header and perpendicular thereto. Each of the outlet passageways leads to a line of outlet openings 233 passing through the inner face of the base in the centers between the other alternate lines of pegs 210. As shown particularly in FIG. 7, the outlet header 229, as well as its branch passageways 231 and outlet openings 233, are all located deeper within the base 202 than the inlet header 219 including its branch passageways 221 and its inlet openings 223.

It will thus be seen that, in the FIG. 7 embodiment, the cooling fluid flows through the inlet tube 218, through its inlet header 219 to the plurality of branch passageways 221, and out through the openings 223, all in parallel. The latter openings are of sufficiently small crosssectional area so that the velocity of the cooling liquid is increased as it exits from these openings to form jets impinging on the underface of the reflector member 204. The spent cooling liquid then flows through openings 233 and branch passageways 231 to the outlet header 229, and out through the outlet tube 228.

While the invention has been described with respect to three preferred embodiments, it will be appreciated that many other variations, modifications and applications of the invention may be made.

What is claimed is:

1. A cooled mirror particularly useful in lasers, comprising a reflector member, a rigid base, a plurality of spaced supporting elements joined to the underface of said reflector member and to said base such as to reduce bending of said reflector member by thermal deformation, and cooling means for cooling said reflector member; characterized in that said cooling means comprises an inlet for a cooling fluid, an outlet for the cooling fluid, and fluid-conducting means constraining the cooling fluid to flow from said inlet, through the spaces between said plurality of spaced supporting elements along a plurality of paths which are in parallel between said inlet and outlet, and then through said outlet to impinge on the underface of said reflector member at a plurality of discrete points thereon each located in one of said parallel paths.

2. The cooled mirror according to claim 1, wherein said fluid-conducting means increases the velocity of said cooling fluid in each of said parallel paths so as to form high-velocity jets when impinging on the underface of said reflector member at the plurality of discrete points thereon.

3. The cooled mirror according to claim 1, wherein there are a plurality of said parallel paths of cooling fluid and discrete impingement points per cm$^2$ of said reflector member.

4. The cooled mirror according to claim 1, wherein said fluid-conducting means comprises passageways through said plurality of spaced supporting elements, the latter being in the form of hollow tubes, said hollow tubes being further formed with holes through the walls adjacent to their ends where joined to the underface of said reflector member.

5. The cooled mirror according to claim 1, further including a plurality of heat-conductor bars joined to the underface of said reflector member and extending in the spaces between said supporting elements.

6. The cooled mirror according to claim 1, wherein said rigid base includes a partition defining on one side an inlet chamber for the cooling fluid, and on the opposite side an outlet chamber for the cooling fluid.

7. The cooled mirror according to claim 6, wherein said spaced supporting elements are hollow tubes defining passageways for the flow of the cooling fluid therethrough, said hollow tubes passing through and being fixed within said partition.

8. The cooled mirror according to claim 6, wherein said spaced supporting elements are solid pegs mounted to the base and passing through holes in said partition, which holes are of slightly larger cross-sectional area than the pegs so as to provide passageways between them for conducting the cooling fluid to flow in the form of high-velocity annular jets to impinge the underface of said reflector member at said plurality of discrete points thereon.

9. The cooled mirror according to claim 1, wherein said plurality of supporting elements are in the form of pegs integrally formed with said base.

10. The cooled mirror according to claim 1, wherein said fluid-conducting means comprises: a plurality of inlet openings through said base between said spaced supporting elements, said inlet openings leading from said inlets to the underface of said reflector member; and a plurality of outlet openings through said base between said spaced supporting elements, said outlet openings leading from said outlet to the underface of said reflector member.

11. The cooled mirror according to claim 10, wherein said fluid-conducting means comprises: an inlet header extending through said base and formed with a plurality of spaced, parallel branches perpendicular thereto, each of which branches leads to a line of said inlet openings; and an outlet header extending through said base and also formed with a plurality of spaced parallel branches perpendicular thereto, each of which branches leads to a line of said outlet openings inbetween said inlet openings.

12. A cooled mirror particularly useful in lasers including a reflector member, a rigid base, a plurality of spaced supporting elements joining said reflector member to said base such as to provide high resistance to thermal deformation tending to produce bending of the reflector member; heat-conductor bars extending from said reflector member between and spaced from said supporting elements; and means for feeding a cooling fluid through the spaces between said supporting elements and said heat-conductor bars; said supporting elements being hollow tubes formed with holes through their walls at their ends adjacent to said reflector member, the opposite ends of said hollow tubes leading to an inlet chamber for said cooling fluid such that the cooling fluid flows from said inlet chamber through the interiors of said hollow tubes in parallel, then through the openings in the walls of the hollow tubes at their ends adjacent to said reflector member, and then through the spaces between the hollow tubes and said heat-conductor bars.

13. The cooled mirror according to claim 12, wherein said holes formed through the walls of said hollow tubes are each of substantially smaller diameter than the internal diameteroof the hollow tubes and together have a total cross-sectional area less than that of the internal diameter of the hollow tube, such that the fluid issues from said holes in the form of high-velocity fluid jets thereby enhancing the cooling effected of said reflector member.

14. A method of cooling a mirror including a reflector, a rigid base, and a plurality of spaced supporting elements joining discrete points on the underface of the reflector with said base such as to reduce bending by defomation of the reflector, characterized in directing a cooling fluid to flow through a plurality of spaced parallel paths to impinge on a face of said reflector at a plurality of discrete points thereon, and increasing the velocity of said fluid in each of said plurality of parallel paths such that the fluid takes the form of high-velocity jets when impinging on the underface of said mirror at said plurality of discrete points thereon.

15. The method according to claim 14, wherein the cooling fluid is directed to flow through a plurality of said parallel paths per cm$^2$ of the mirror being cooled.

16. the method according to claim 15, wherein said cooling fluid is a liquid.

17. The method according to claim 14, wherein said cooling fluid is directed to flow through the interior of said plurality of supporting elements, then through holes formed at the ends thereof adjacent to the underface of the reflector being cooled, and then along the exteriors of said plurality of supporting elements.

18. The method according to claim 14, wherein said cooling fluid is directed to flow along the external surfaces of said plurality of supporting elements into direct contact with the plurality of discrete points of the reflector.

19. The method according to claim 14, wherein said cooling fluid is directed to flow through a plurality of inlet openings formed through the base into direct contact with the underface of the reflector, and then through a plurality of outlet openings formed through said base.

* * * * *